United States Patent [19]
Serruys

[11] Patent Number: 6,046,428
[45] Date of Patent: Apr. 4, 2000

[54] LASER CUTTING DEVICE WITH PARALLEL-PLATE CUTTING TABLE

[75] Inventor: Wim Serruys, Moorsele, Belgium

[73] Assignee: LVD Company n.v., Gullegem, Belgium

[21] Appl. No.: 09/199,812

[22] Filed: Nov. 25, 1998

[30] Foreign Application Priority Data

Nov. 25, 1997 [BE] Belgium ................................ 09700945

[51] Int. Cl.⁷ ................................................. B23K 26/08
[52] U.S. Cl. .................................. 219/121.67; 219/121.82
[58] Field of Search ........................ 219/121.6, 121.67, 219/121.82; 108/57.17; 83/109, 157, 451; 414/222.01, 222.08, 222.13

[56] References Cited

U.S. PATENT DOCUMENTS

| | | | |
|---|---|---|---|
| 3,736,402 | 5/1973 | Mefferd et al. | 219/121.67 |
| 5,128,512 | 7/1992 | Seki | 219/121.82 |
| 5,132,510 | 7/1992 | Klingel et al. | 219/121.82 |
| 5,185,510 | 2/1993 | Zumstein | 219/121.67 |
| 5,192,848 | 3/1993 | Miyakawa et al. | 219/121.82 |
| 5,382,772 | 1/1995 | Zumstein | 219/121.67 |

FOREIGN PATENT DOCUMENTS

| | | | |
|---|---|---|---|
| 327895 | 8/1989 | European Pat. Off. | 219/121.67 |
| 2147284 | 3/1973 | Germany | 219/121.67 |
| 4119565 | 12/1992 | Germany | 219/121.67 |
| 63-2580 | 1/1988 | Japan . | |

*Primary Examiner*—Gregory Mills
*Attorney, Agent, or Firm*—James Creighton Wray; Meera P. Narasimhan

[57] ABSTRACT

Laser cutting device comprising a movable cutting head, cutting table for supporting a workpiece to be cut, a movable loading and unloading carriage for the placing of the workpiece on the cutting table and again removing it here from, as well as a product carriage for stacking up cut workpieces. In order to make the cutting head more dynamic and to facilitate the loading and unloading of the cutting table according to the invention it is proposed to make the cutting head only movable in the horizontal plane and to make the cutting table vertically movable. The cutting table is formed by a number of parallel vertical plates standing at mutual distance from one another between which a fork of the loading and unloading carriage can reach. The fork does not need to be able to perform a vertical movement.

4 Claims, 1 Drawing Sheet

6,046,428

LASER CUTTING DEVICE WITH PARALLEL-PLATE CUTTING TABLE

BACKGROUND OF THE INVENTION

This invention relates to a laser cutting device according to the opening lines of claim 1.

With currently known laser cutting devices the workpiece is supported on the fixed cutting table, while the cutting head is movable in three directions (x-, Y-, and Z-direction) standing perpendicular to each other. The vertical movement in the Z-direction of the cutting head is hereby necessary in order to be able to maintain it at a constant distance from the workpiece, which is usually formed by a plate. In this manner it is possible that the cutting head follows possible undulations in the plate. These movement possibilities of the cutting head result in the cutting head having to be made relatively heavy and complicated. Because of this the cutting head becomes slow and cumbersome, which is undesirable with these laser cutting devices.

The invention now aims at providing a laser cutting device, whereby the above mentioned disadvantage is suitably avoided.

A following aim of this invention is to provide a laser cutting device of the above mentioned type, whereby the placing of the workpiece on the cutting table and again removing it here from can take place automatically.

SUMMARY OF THE INVENTION

This and other aims of the invention are achieved by means of a laser cutting device, which is distinguished, because of the fact that the cutting head is only movable in the horizontal plane in two directions (X and Y) standing perpendicular to each other, and the cutting table is movable in vertical direction (Z). Because of the fact that the cutting head only has to move in the horizontal plane, this can be made much lighter and through that react much more dynamically than was the case up until now.

The embodiment according to claim 2 is particularly suitable for the automated placing of the workpiece on the cutting table and removing it here from.

The remaining claims 3 and 4 indicate a suitable embodiment of the laser cutting device according to the invention, whereby the cut workpieces, removed from the cutting table, can easily and neatly be stacked up.

The invention is further explained on the basis of the attached drawings, in which:

DETAILED DESCRIPTION OF THE PREFERRED EMBODIMENT

Figure 1:
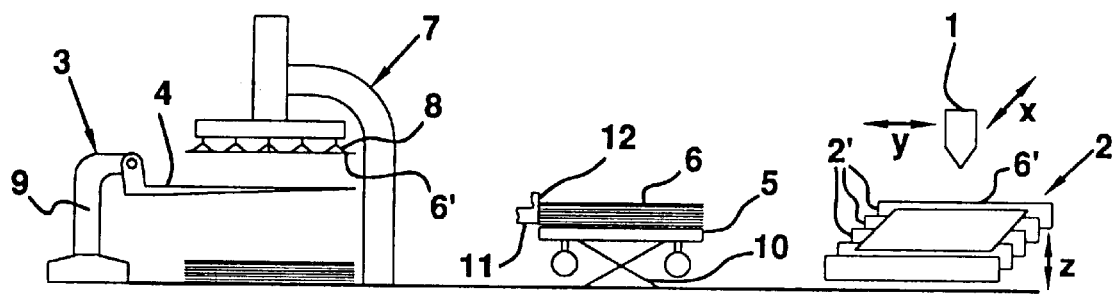
FIG. 1 shows a schematic view of the laser cutting device according to the invention in a position, in which the loading and unloading carriage picks up a new plate and the cutting table is in the low position.

The laser cutting device shown very schematically in the figures is principally formed by a laser cutting machine, which is only shown with a cutting head 1 and a cutting table 2, a loading and unloading carriage 3 with a loading fork 4 as well as a product carriage 5 for stacking up cut workpieces 6, which here principally have the form of flat plates. In the figures a loading mechanism 7 is also shown, which by means of for example suction cups 8 picks up from a stack of such plates a plate 6' to be cut and places it on the fork 4 of the loading and unloading carriage 5. This loading mechanism can have any suitable conventional design and is in fact not part of the device according to the invention.

For the performance of the cutting movement the cutting head 1 of the laser cutting machine is movable in the horizontal plane in two directions X and Y standing perpendicular to each other indicated by double arrows. The cutting table 2 consists of a number of parallel plates 2' disposed vertically at mutually equal distance from one another, which collectively determined a horizontal supporting surface for the plate-shaped workpiece 6'. The cutting table 2 is according to the invention vertically movable in the direction of the double arrow Z. This movement of the cutting table is necessary in order to be able to regulate the distance between the cutting head and the plate to be cut. In this manner undulations present in the plate to be cut can be followed by the cutting head without any problem, so that the optimum cutting operation is always obtained.

With the laser cutting machines known up until now according to the state-of-the-art a fixed cutting table is utilized, and apart from the horizontal movements the cutting head also has to perform the vertical movement. This results in the mechanism for moving the cutting head being made more complicated and therefore heavier and the cutting head thereby reacts relatively slowly, which is avoided with the construction proposed here according to the invention.

The vertical mobility of the cutting table can according to the invention also be utilized for automatically placing a new plate 6' to be cut on to the cutting table 2 by means of the loading and unloading carriage 3 and subsequently again removing it from here from the cut plate 6.

Figure 2:
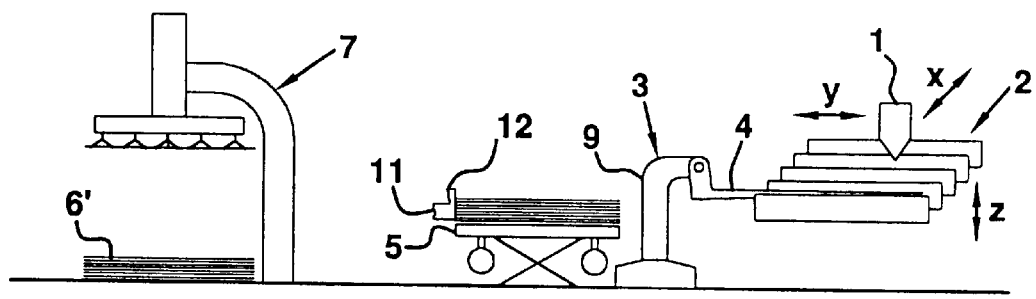
FIG. 2 shows the laser cutting device from FIG. 1 in the position, in which the cutting table has taken the plate over from the loading and unloading carriage and is in the high position.

The loading and unloading carriage consists of a mobile or horizontally movable chassis 9, which bears the fork 4, which consists of a number of parallel principally horizontally running teeth, of which only one is visible in the figures. A plate 6' to be cut is, as shown in FIG. 1, placed by means of the loading mechanism 7 on the fork 4. The loading mechanism 7 hereby only needs to move the plate 6' in vertical direction. The carriage 3 subsequently moves toward the cutting table 2, which is initially in the low position. The carriage 3 is so directed that the teeth of the fork 4 extend parallel to and between the plates 2' of the cutting table. When the carriage approaches the cutting table, the cutting table is placed in the low position, whereby the supporting surface of the cutting table lies somewhat lower than the supporting surface of the fork 4 formed by the teeth on which the plate 6' to be cut rests. The cutting table is subsequently moved vertically upward, whereby the plates 2' move upward between the teeth of the fork and lift the plate 6' from the fork 4. This position is shown in FIG. 2.

The loading and unloading carriage 3 is moved out of the position shown in FIG. 2, so that the fork 4 hereof is completely outside the cutting table and the plate 6' can subsequently be cut by means of the cutting head 1.

After the cutting of the plate 6' the cut plate 6 is in inverse manner again placed on the fork 4 of the loading and unloading carriage by successively moving the cutting table upward, guiding the fork of the loading and unloading carriage between the vertical plates 2' and bringing the cutting table downward again, until the fork supports the cut plate 6.

The vertical movement of the cutting table 2 thereby not only has an important function when cutting the workpiece but also an important function when placing the workpiece on the cutting table and again removing it here from. The fork 4 of the loading and unloading carriage 3 therefore only needs to perform a horizontal movement for loading and unloading the workpiece. This carriage can therefore accordingly be made simpler and cheaper.

Figure 3:
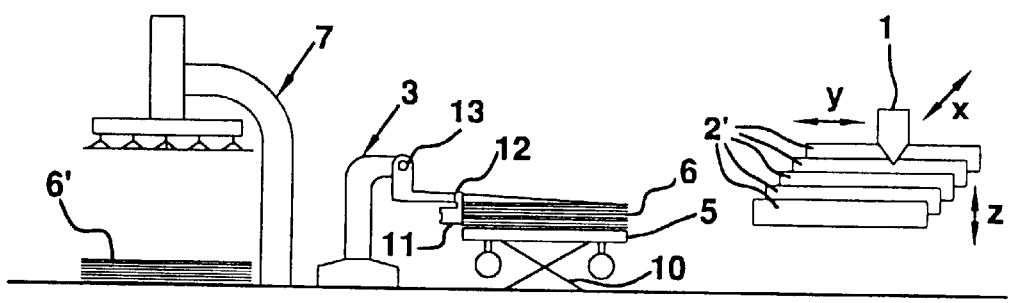
FIG. 3 shows the assembly from FIGS. 1 and 2 in the position, in which the loading and unloading carriage lays the cut plate down on the product carriage.

The cut plate 6' is subsequently, as shown in FIG. 3, stacked up on the product carriage 5. The product carriage is vertically adjustable in height by means of a lifting table 10 in itself known. The product carriage has a supporting surface for the cut products 6, which supporting surface is limited on one side by a stop wall 11. The stop wall is provided on top with a comb 12, which consists of upright projections situated at mutual distance from one another, which are so disposed that the teeth of the fork can reach between these projections. The height of the projections is such that the top of these projections lie slightly under the supporting surface formed by the teeth of the fork. In this manner the cut plate lying on the fork can be guided over the projections to above the stack of cut plates 6 on the product carriage, whereby the teeth are thus partially situated between the projections.

The fork 4 is rotatably mounted around a horizontal axis 13 on the chassis 9, in fact such that the teeth of the fork can move slightly downward from the horizontal position with the free extremities.

Stacking the cut plates 6 up on the product carriage 5 occurs in the following manner.

The fork 4 of the loading and unloading carriage 3 supports a cut plate 6, which as described above has been received from the cutting table. The fork is hereby in the normal horizontal position. The fork 4 is now so placed that the teeth of the fork reach between the aforesaid projections of the comb 12 and the cut plate 6 lies above the already present stack of cut plates. The height of the projections is hereby such that the plate 6 resting on the fork 4 can move over this without any problem. Subsequently the fork rotates around the axis 13, until the free extremities of the teeth hereof rest on the stack of cut plates 6. Because of this the supporting surface of the fork is lowered to below the top of the projections of the comb 12. If the fork 4 is now drawn back out of the comb 12 the cut plate resting on the fork is retained by the projections of the comb 12 and thereby slid off the fork. The cut plate 6 in this manner comes to lie neatly against the stop wall 11 on the already present stack of cut plates. The plate hereby slides from the fork onto the stack and does therefore not fall from a certain height onto the stack, as with the state-of-the-art. It must be clear that apart from the parts shown and described here the device also comprises the necessary driving means as well as control and operating means, all of which are in themselves known and need not be further discussed here.

The invention is not restricted to the embodiment described and shown here but can within the scope of the attached claims comprise various modifications and variants.

I claim:

1. Laser cutting device, comprising a movable cutting head, a cutting table for supporting a workpiece to be cut, a movable loading and unloading carriage for the placing of the workpiece on the cutting table and again removing it here from, as well as a product carriage for collecting cut workpieces, in which the cutting head (1) is only movable in a horizontal plane in two directions (X, Y) standing perpendicular to each other, and in which the cutting table (2) is movable in vertical direction (Z), characterized in that, the cutting table is formed by a number of parallel, vertically directed plates (2') standing at mutually equal distance from one another and the loading and unloading carriage (3) comprises a fork (4) with a number of parallel teeth, which can reach between the plates of the cutting table (2), which fork is movable in a horizontal plane.

2. Laser cutting device according to claim 1, characterized in that, the fork (4) is rotatably mounted around a horizontal axis (13) on the chassis (9) of the loading and unloading carriage.

3. Laser cutting device according to claim 2, characterized in that, the product carriage (5) is made adjustable in height and is provided with a loading surface, which is limited on one side by an upright stop wall (11), which stop wall is provided on top with a comb (12) with upright projections situated at mutual distance from one another, which have a mutual distance from one another corresponding to the teeth of the fork, such that the teeth of the fork can reach between these projections.

4. Laser cutting device according to claim 1, characterized in that, the product carriage (5) is made adjustable in height and is provided with a loading surface, which is limited on one side by an upright stop wall (11), which stop wall is provided on top with a comb (12) with upright projections situated at mutual distance from one another, which have a mutual distance from one another corresponding to the teeth of the fork, such that the teeth of the fork can reach between these projections.

* * * * *